United States Patent [19]

Koseki

[11] Patent Number: 4,840,213
[45] Date of Patent: Jun. 20, 1989

[54] HEAVY DUTY LOW PROFILE PNEUMATIC RADIAL TIRES

[75] Inventor: Hiroyuki Koseki, Kodaira, Japan

[73] Assignee: Bridgestone Corporation, Tokyo, Japan

[21] Appl. No.: 174,268

[22] Filed: Mar. 28, 1988

[30] Foreign Application Priority Data

Apr. 3, 1987 [JP] Japan .................................. 62-82463

[51] Int. Cl.$^4$ ...................... B60C 03/04; B60C 09/28
[52] U.S. Cl. ..................... 152/454; 152/538
[58] Field of Search .................. 152/209 R, 454, 526, 152/538, 539, 548

[56] References Cited

U.S. PATENT DOCUMENTS

| | | | |
|---|---|---|---|
| 3,757,844 | 9/1973 | Verdier | 152/454 |
| 3,910,336 | 10/1975 | Boileau | 152/454 X |
| 4,076,066 | 2/1978 | Verdier | 152/454 |
| 4,345,634 | 8/1982 | Giron | 152/454 |
| 4,387,758 | 6/1983 | Matsuda et al. | 152/454 |
| 4,418,735 | 12/1983 | Musy | 152/531 X |
| 4,420,025 | 12/1983 | Ghilardi et al. | 152/531 X |
| 4,481,994 | 11/1984 | Pommier | 152/454 |

FOREIGN PATENT DOCUMENTS

| | | | |
|---|---|---|---|
| 2035925 | 6/1980 | United Kingdom | 152/454 |
| 2044693 | 10/1980 | United Kingdom | 152/454 |

Primary Examiner—Raymond Hoch
Attorney, Agent, or Firm—Sughrue, Mion, Zinn, Macpeak & Seas

[57] ABSTRACT

Tubeless type heavy duty low profile pneumatic radial tires are disclosed, which each comprise a radial carcass layer toroidally extending from one of beads to the other, and a belt comprising at least two plies successively closed piled on a crown portion of the carcass layer. The at least two plies have non-extensible cords arranged at a shallow angle with respect to an equatorial plane of the tire but intersecting between the plies through the tire equatorial plane. The tire uses at 15° rim as a design rim thereof. When the tire is assembled into the design rim and inflated at a normal internal pressure, a shape of the carcass line in a tire radial section meets the following inequalities (1) through (4).

$$0.45 \leq H/B \leq 0.75 \quad (1)$$

$$(-0.12\ H/B) + 0.79 \leq l/B \leq (-0.12\ H/B) + 0.85 \quad (2)$$

$$(0.1\ H/B) + 1.11 \leq B/J \leq (0.1\ H/B) + 1.15 \quad (3)$$

$$0 < a/H \leq 0.017 \quad (4)$$

In the above, H, B, a, J and l are the maximum sectional height of the carcass line from a diameter line of the design rim, the maximum axial width of the carcass line, a maximum distance between a straight line which is in parallel with a rotary axis of the tire in the radial section and intersects with the carcass line at two points which are separated from each other by a distance: L=0.96B−0.77H, a width of the rim, and an axial width of a zone where the cords between the belt plies intersect with one another, respectively.

2 Claims, 1 Drawing Sheet

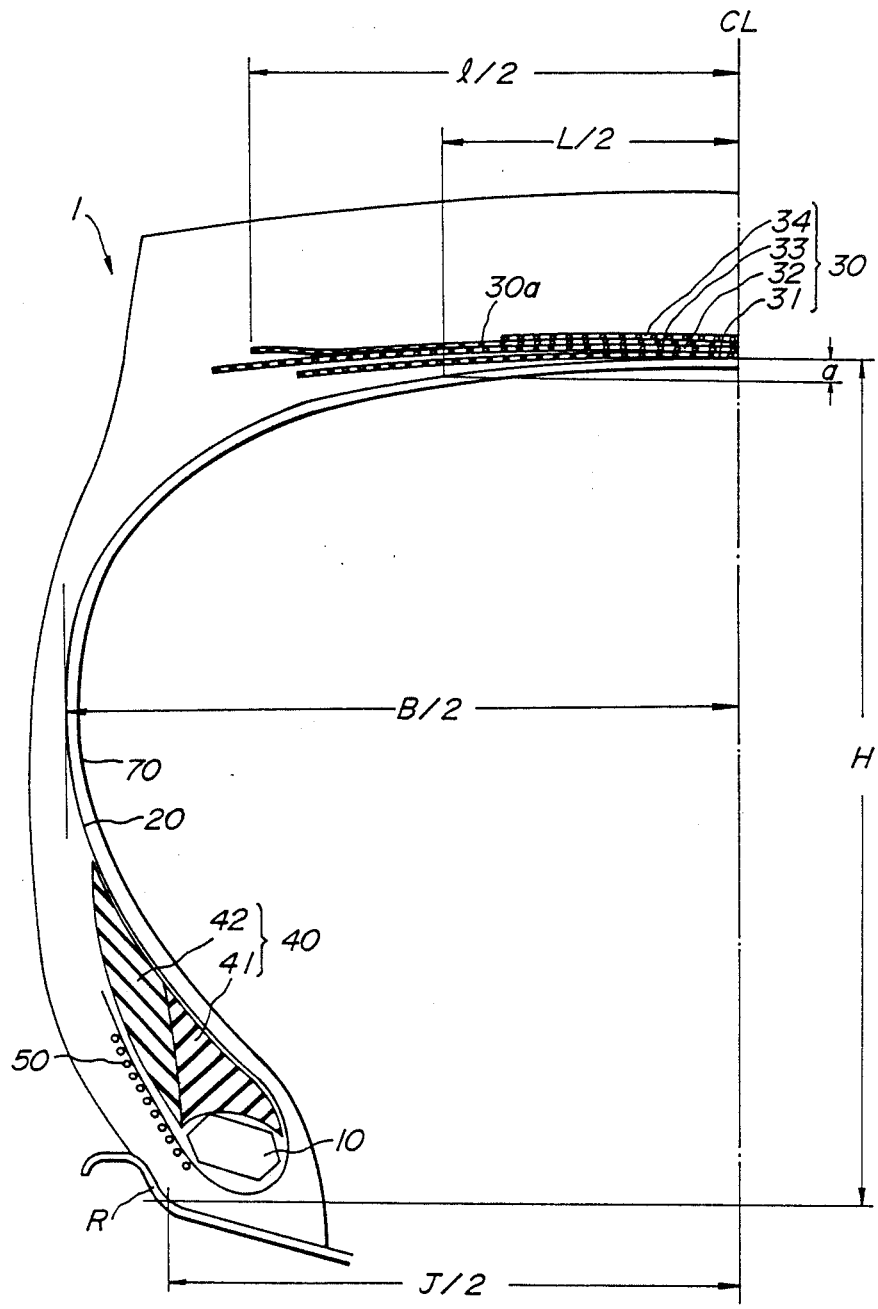

HEAVY DUTY LOW PROFILE PNEUMATIC RADIAL TIRES

BACKGROUND OF THE INVENTION (1) Field of the Invention

The present invention relates to improvement of heavy duty low profile pneumatic radial tires.

(2) Related Art Statement

When the aspect ratio of a tire is lowered to decrease the dimension and weight thereof, the diameter of the belt of the tire increases and grows due to deformation caused by application of an internal pressure and creeps produced in running history. Consequently, it is likely that harmful deformation occurs at a shoulder portion and that separation occurs at an end portion of a belt layer.

In order to reduce such drawbacks, U.S. Pat. No. 4,387,758 proposes a technique to control the shape of a carcass or U.S. Pat. No. 4,420,025 discloses a technique to provide an auxiliary layer having cords arranged substantially in parallel with a tire circumferential direction.

However, in the case of the carcass shape proposed in U.S. Pat. No. 4,387,758, as the aspect ratio is decreased, an effect to suppress the deformation of the shoulder portion due to the application of the internal pressure becomes smaller. On the other hand, since an axial end portion of a belt layer is bent toward the tire inside relative to the carcass layer as a natural axis, an axial component of stress acts upon the belt layer. As a result, although the shoulder portion is not largely deformed due to the application of internal pressure, a circumferential component of the stress acts upon the belt layer. Thus, an effect to restrain enlargement of a tire diameter resulting from creep in the tire running history is small.

To the contrary, the technique as proposed in U.S. Pat. No. 4,420,025 in which the enlargement of the diameter of the shoulder portion is suppressed by locally increasing rigidity of the belt per unit width is effective to restrain the diameter enlargement due to the tire running history. However, this technique has the drawback that the tire is likely to be unevenly worn due to variation in rigidity occurring on the ground contact surface.

SUMMARY OF THE INVENTION

The present invention has been accomplished through experiments and studies to eliminate the above-mentioned problems.

Therefore, it is an object of the present invention to provide excellent heavy duty low profile pneumatic radial tires in which durability of a belt layer can be improved by reducing a stress shared by the belt layer, increasing the rigidity of the belt, although not locally, to restrain occurrence of uneven wearing, and thus effectively suppressing growth of the shoulder portion.

According to the present invention, there is a provision of tubeless type heavy duty low profile pneumatic radial tires each comprising a radial carcass layer toroidally extending from one of beads to the other, and a belt comprising at least two plies successively closely piled on a crown portion of the carcass layer, said at least two plies having non-extensible cords arranged at a shallow angle with respect to an equatorial plane of the tire but intersecting between the plies through the tire equatorial plane, said tires each using a 15° rim as a design rim thereof, wherein when the tire is assembled into the design rim and inflated at a normal internal pressure, a shape of the carcass line in a tire radial section meets the following inequalities (1) through (4).

$$0.45 \leq H/B \leq 0.75 \tag{1}$$

$$(-0.12 H/B) + 0.79 \leq 1/B \leq (-0.12 H/B) + 0.85 \tag{2}$$

$$(0.1 H/B) + 1.11 \leq B/J \leq (0.1 H/B) + 1.15 \tag{3}$$

$$0 < a/H \leq 0.017 \tag{4}$$

in which H, B, a, J and l are the maximum sectional height of the carcass line from a diameter line of the design rim, the maximum axial width of the carcass line, a maximum distance between a straight line which is in parallel with a rotary axis of the tire in the radial section and intersects with the carcass line at two points which are separated from each other by a distance: $L = 0.96B - 0.77H$, a width of the rim, and an axial width of a zone where the cords between the belt plies intersect with one another, respectively.

According to the present invention, the stress shared by the belt can be lowered and the rigidity of the belt is increased to restrain occurrence of uneven wearing, and durability of the belt layer can be improved by effectively restraining the growth of the shoulder portion.

These and other objects, features and advantages of the invention will be appreciated upon reading the following description of the invention when taken in conjunction with the attached drawing, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWING

For a better understanding of the invention, reference is made to the attached drawing, wherein:

The sole figure is a radially sectional half view schematically illustrating a heavy duty low profile pneumatic radial tire as an embodiment according to the present invention.

DETAILED DESCRIPTION OF THE INVENTION

The term "carcass line" is used throughout the specification and claims to mean a center line of the carcass layer. More specifically, when the carcass layer consists of a single ply, the carcass line means a line passing through centers of cords of the carcass. When the carcass layer consists of a plurality of plies, the carcass line is a center line in the width of the carcass.

The term "nominal rim diameter line" is used throughout the specification and claims to mean a straight line which is spaced from the tire rotary axis by a distance half of the nominal rim diameter and in parallel with the tire rotary axis. That is, the nominal rim diameter line is a so-called bead base line.

The present invention will be explained in more detail based on an embodiment with reference to the attached drawing.

The FIGURE is a radially sectional half view illustrating a heavy duty low profile pneumatic radial tire as one embodiment according to the present invention.

In the FIGURE, reference numeral "1" denotes the heavy duty low profile pneumatic radial tire as the embodiment according to the present invention. The radial tire comprises a radial carcass ("20" denotes the carcass line) which toroidally extends from one of beads, 10, to the other (not shown), and a belt 30 consisting of at least two (in the figure, four plies 31, 32, 33, and 34) successively closely arranged on a crown portion of the carcass layer. For instance, the carcass layer consists of one ply composed of non-extensible cords represented by steel cords. The belt comprises at least two plies having non-extensible cords 30a represented by steel cords and arranged at a shallow angle (10° to 30°) with respect to a tire equatorial plane CL while the cords 30a intersect between the plies with respect to the equatorial plane CL.

According to the present invention, when the tire is assembled onto a design rim and inflated at a normal internal pressure, the shape of the carcass line meets the following inequalities (1) through (4):

$$0.45 \leq H/B \leq 0.75 \quad (1)$$

$$(-0.12\ H/B) + 0.79 \leq l/B \leq (-0.12\ H/B) + 0.85 \quad (2)$$

$$(0.1\ H/B) + 1.11 \leq B/J \leq (0.1\ H/B) + 1.15 \quad (3)$$

$$0 < a/H \leq 0.017 \quad (4)$$

wherein H, B, a, J, and l denote the same meanings as given above, respectively.

Reference numeral 40 is a bead filler, which consists of a lower bead filler 41 made of hard rubber and an upper bead filler 42 made of soft rubber.

Reference numeral 50 is a chaffer, which extends from an R side of the rim at the bead portion to the upper bead filler 42. Reference numeral 70 is an inner liner.

The limitations posed in the present invention will be explained in more detail.

The inequality (1), that is, $0.45 \leq H/B \leq 0.75$, represents the aspect ratio of the tire. The value of H/B in ordinary heavy duty tires is about 1.0, and about 0.85 at the minimum. Thus, the problem discussed in the present invention will not greatly occur in such tires. The present invention is aimed at tires having considerably low aspect ratios.

In the present invention, the inequality (3), that is, $(0.1\ H/B) + 1.11 \leq B/J \leq (0.1\ H/B) + 1.15$, makes a limitation upon the maximum width of the carcass line.

In this inequality, if B/J is set at not more than the upper limit in the above inequality, a stress shared by the belt 30 can be decreased. In this case, the curvature of the carcass line is smaller. Thereby, while the rate of the stress borne by the carcass layer to the entire stress borne by the tire due to the internal pressure is increased, that shared by the belt 30 is reduced.

On the other hand, the lower limit is a limit at which durability of the bead is not damaged.

Next, the inequality (2), that is, $(-0.12\ H/B) + 0.79 \leq l/B \leq (-0.12\ H/B) + 0.85$, makes a limitation upon the width of the belt layer to meet a stress acting upon the belt layer which stress is lowered according to the inequation (3). In this case, if the value of l/B is lower than the lower limitation of the inequality (2), effective rigidity cannot be obtained for the shoulder portion so that the diameter of the shoulder is enlarged or grown.

On the other hand, the upper limitation is a limitation of a zone in which strain will not concentrate upon the end portion of the belt during tire rotating.

When even either one of the inequalities (2) and (3) is not satisfied, expected effects cannot be obtained.

The present invention is fulfilled when the limitation in the inequality (4) is also satisfied.

The inequality (4) specifies the range of the ratio of "a" to the sectional height H of the carcass line, that is, the ratio, to the sectional height H of the carcass line, of a distance between the apex of the carcass line and an imaginary straight line which is positioned on opposite sides of the tire equatorial plane at the crown portion in a tire radial section, is in parallel with the tire rotary axis, and intersects with the carcass lines at two points which are symmetrically positioned with respect to the tire equatorial plane and separated from each other by a distance of $L = 0.96B - 0.77H$.

In ordinary low profile tires, the value of a/H after application of a normal internal pressure has not been set at not more than 0.017. This is because it has been necessary to set the value of "a" at a higher level, considering the fact that growth of the shoulder portion in the case of low profile tires becomes greater during tire rotation.

However, the present inventors have found out through research that when the carcass layer 20 and the belt 30 are formed to satisfy the above-mentioned inequalities (2) and (3), the smaller the value of a/H, the greater the stress shared by the belt 30 at the tire center portion, whereas the smaller that at the shoulder portion to the contrary. That is, they found out that the smaller value of a/H is preferable because the growth of the shoulder portion is restrained during tire rotating to improve durability of the belt.

Therefore, it is preferable to set the value of a/H at $0 < a/H \leq 0.017$.

The present invention will be more concretely explained with reference to a specific example and comparative examples.

Tires each having the following specifications were prepared, and run on a drum by 20,000 km under 150% of a normal load to confirm the effects of the present invention.

Specifications of tires used in evaluation experiments:
Tire size: 11/70 R 22.5 =
Internal pressure: 8.00 kg/cm$^2$
Rim: 8.25 V×20
Carcass: 1 ply
Carcass cord: $(3+9+15) \times 0.15 + 1$
Belt layers: 4 plies
Belt cords: steel cords $(3 \times 0.20 + 6 \times 0.38)$
Belt cords angle:
 First ply (31): rising right hand at 65° toward the back side
 Second ply (32): rising right hand at 18° toward the back side
 Third ply (33): rising left hand at 18° toward back side
 Fourth ply (34): rising left hand at 18° toward back side The above-mentioned specifications were common with respect to all the tires in Example of the present invention and Comparative Examples, and the other specifications than, these mentioned above are shown in the following Table.

|  | Conventional profile | Example | Comparative Example 1 | Comparative Example 2 | Comparative Example 3 | Comparative Example 4 | Comparative Example 5 |
|---|---|---|---|---|---|---|---|
| H | 170.0 (mm) | 170.0 (mm) | 170.0 (mm) | 170.0 (mm) | 170.0 (mm) | 170.0 (mm) | 170.0 (mm) |
| B | 256.0 (mm) | 248.0 (mm) | 256.0 (mm) | 244.0 (mm) | 248.0 (mm) | 248.0 (mm) | 248.0 (mm) |
| J | 209.6 (mm) | 209.6 (mm) | 209.6 (mm) | 209.6 (mm) | 209.6 (mm) | 209.6 (mm) | 209.6 (mm) |
| l | 180.0 (mm) | 190.0 (mm) | 190.0 (mm) | 185.0 (mm) | 170.0 (mm) | 195.0 (mm) | 190.0 (mm) |
| a | 4.0 (mm) | 2.5 (mm) | 2.7 (mm) | 2.4 (mm) | 2.5 (mm) | 2.5 (mm) | 3.7 (mm) |
| $L = 0.96B - 0.77H$ | 114.9 | 107.2 | 114.9 | 103.3 | 107.2 | 107.2 | 107.2 |
| $(0.1H/B) + 1.11 \leq B/J \leq (0.1H/B) + 1.15$ | $1.176 \leq 1.221 \leq 1.216$ | $1.179 \leq 1.183 \leq 1.219$ | $1.176 \leq 1.221 \leq 1.216$ | $1.180 \leq 1.164 \leq 1.220$ | $1.179 \leq 1.183 \leq 1.219$ | $1.179 \leq 1.183 \leq 1.219$ | $1.179 \leq 1.183 \leq 1.219$ |
| $(-0.12 H/B) + 0.79 \leq l/B \leq (-0.12 H/B) + 0.85$ | $0.7103 \leq 0.7031 \leq 0.7703$ | $0.7077 \leq 0.7661 \leq 0.7677$ | $0.7103 \leq 0.7422 \leq 0.7703$ | $0.7064 \leq 0.7582 \leq 0.7664$ | $0.7077 \leq 0.6855 \leq 0.7677$ | $0.7077 \leq 0.7863 \leq 0.7677$ | $0.7077 \leq 0.7661 \leq 0.7677$ |
| $0 < a/H \leq 0.017$ | 0.0235 | 0.0147 | 0.0159 | 0.0141 | 0.0147 | 0.0147 | 0.0218 |
| H/B | 0.6641 | 0.6855 | 0.6641 | 0.6967 | 0.6855 | 0.6855 | 0.6855 |
| Growth of shoulder portion | 100 | 65 | 90 | 55 | 95 | 55 | 90 |
| Length of cracks at end portion of belt layer | 100 | 75 | 95 | 70 | 95 | 90 | 95 |
| Trouble at bead portion | No | No | No | Occurred | No | No | No |

Note:
(1) The growth of the shoulder portion was evaluated by index taking that in the tire of the conventional shape (2.00 mm) as 100.
(2) The length of cracks at an end portion of a belt layer was evaluated by index taking that in the tire of the conventional shape as 100.
(3) The trouble in the bead portion was visually checked.

Comparative Examples 1 and 2 had values of B/J outside the scope of the present invention, while Comparative Examples 3 and 4 had values of l/B falling outside the scope of the present invention. Comparative Example 5 had a value of a/H exceeding its upper limit in the present invention.

In Comparative Example 1, durability of the belt was poor. In Comparative Example 2, the width of the carcass was narrower to deteriorate durability of the bead, although the belt had good durability. In Comparative Example 3, rigidity of the shoulder portion was not satisfactory. In Comparative Example 4, the belt layer was deteriorated due to a greater strain under application of the load, although running performances were good. In Comparative Example 5, the belt was cracked and the growth of the shoulder portion was great.

As is clear from the above Table, the tire of Example of the present invention is more excellent than those of the conventional tire and Comparative tires.

Since the present invention is defined as mentioned above, stress shared by the belt can be reduced and enlargement and growth of the diameter of the belt near the shoulder portion due to application of the internal pressure and running history (flattering) can effectively be restrained, so that durability of the belt in the low profile tires can greatly be improved.

What is claimed is:

1. A tubeless type heavy duty low profile pneumatic radial tire comprising a radial carcass layer toroidally extending from one of beads to the other, and a belt comprising at least two plies successively closely plied on a crown portion of the carcass layer, said at least two plies having non-extensible cords arranged at a shallow angle with respect to an equatorial plane of the tire but intersecting between the plies through the tire equatorial plane, said tire using a 15° rim as a design rum thereof, wherein when the tire is assembled into the design rim and inflated at a normal internal pressure, a shape of the carcass line in a tire radial section meets the following inequalities (1) through (4):

$$0.45 \leq H/B \leq 0.75 \tag{1}$$

$$('0.12 H/B) + 0.79 \leq l/B \leq (-0.12 H/B) + 0.85 \tag{2}$$

$$(0.1 H/B) + 1.11 \leq B/J \leq (0.1 H/B) + 1.15 \tag{3}$$

$$0 < a/H \leq 0.017 \tag{4}$$

in which H, B, a, J and are the maximum sectional height of the carcass line measured radially from the bead heel, the maximum axial width of the carcass line, a maximum distance between a straight line which is in parallel with a rotary axis of the tire in the radial section and intersects with the carcass line at two points which are separated from each other by a distance: $L = 0.96B - 0.77H$, width of the tire as measured from one bead heel to the other bead heel and the greatest axial width of a zone where the cords between the belt plies still intersect with one another, respectively.

2. A tubeless type heavy duty low profile pneumatic tire according to claim 1, wherein the carcass layer is composed of non-extensible cords.

* * * * *